United States Patent [19]

Wilcox

[11] 3,740,471

[45] June 19, 1973

[54] AUTOMATIC GAIN CONTROL CIRCUIT

[75] Inventor: Milton E. Wilcox, Mesa, Ariz.

[73] Assignee: Motorola, Inc., Franklin Park, Ill.

[22] Filed: Feb. 24, 1972

[21] Appl. No.: 229,230

Related U.S. Application Data

[62] Division of Ser. No. 71,125, Sept. 10, 1970, Pat. No. 3,697,883.

[52] U.S. Cl. ................................ 178/7.3 R, 330/29

[51] Int. Cl. ............................................ H04n 5/52

[58] Field of Search .................. 178/7.3 R, 7.3 DC, 178/7.5 R, 7.5 DC; 325/397, 400; 328/151; 330/29

[56] References Cited

UNITED STATES PATENTS

| | | | |
|---|---|---|---|
| 3,598,902 | 8/1971 | Davis | 178/7.3 DC |
| 3,579,251 | 5/1971 | Lovelace | 178/7.3 R |
| 3,686,577 | 8/1972 | Fruhauf | 328/151 |
| 3,697,883 | 10/1972 | Wilcox | 330/29 |

*Primary Examiner*—Richard Murray
*Assistant Examiner*—Fay Konzem
*Attorney*—Mueller & Aichele

[57] ABSTRACT

A gated sample and hold IF/RF integrated AGC circuit for a television receiver employs a combination of the synchronizing pulse and a flyback pulse for gating a peak detected video signal during the sync pulse interval to obtain the AGC voltage. A differential amplifier provides RF delay for the RF AGC, with negative feedback from the differential amplifier to the input of the IF AGC amplifier being employed to hold the IF AGC amplifier output constant during a transition period when the RF gain control is varied. Before and after this transition, the IF gain control follows the AGC voltage provided by the gated AGC input circuit.

7 Claims, 3 Drawing Figures

AUTOMATIC GAIN CONTROL CIRCUIT

This is a division, of application Ser. No. 71,125 now U.S. Pat. 3,697,883, filed Sept. 10, 1970.

BACKGROUND OF THE INVENTION

If the amplitude of the composite video signal developed in a television receiver is allowed to vary significantly, a strong incoming signal may cause the video amplifiers to become overloaded, resulting in cross-modulation and clipping of the synchronizing components, while a weak incoming signal may cause the output of the video amplifiers to be too low to provide proper picture reproduction. In addition, unwanted variations of contrast may result from a video signal which is changing in amplitude. To maintain the video signal relatively constant with variations in the level of the incoming television signal, an automatic gain control (AGC) circuit is commonly employed to maintain the signal level applied to the video detector at a substantially constant level. The AGC function is accomplished by developing a control signal which is proportional to the strength of the incoming signal and is applied to the radio frequency (RF) and intermediate frequency (IF) amplifier stages in a manner which decreases the respective gains of these stages as the strength of the incoming signal increases.

It has been learned that when the gain of the RF stage is reduced, the signal-to-noise ratio of the receiver degrades to undesirably increase the noise composition of the video signal. Therefore, the gain of the RF stage should be maintained at a maximum, while the gain of the IF stage is decreased for a range of the weakest signals to be received. When the incoming signal is strong enough to appreciably override the noise, the gain of the RF stage should be reduced in order to prevent overload of succeeding stages, such as the converter. Since the converter has non-linear transfer characteristics excessively high level signals applied to it will introduce intermodulation products into the video signals.

Therefore, it is desirable to maintain the RF gain constant; so that the level of the converter input signal continues to increase for weak incoming signals of increasing strength until the level of such input signals is a predetermined amount less than that which causes converter overload. For further increases in the incoming signal strength, the IF gain should be maintained constant and the RF gain should be reduced at a rate to provide a converter input signal having a constant amplitude somewhat less than the converter overload level. When maximum gain reduction of the RF stage has been effected, further gain reduction then should be resumed in the IF stage.

It further is desirable in present television receivers to provide as much of the receiver circuitry as possible in an integrated circuit form, in order to obtain the advantages inherent in the utilization of integrated circuits. To obtain the most effective use of an integrated circuit providing a gain control system for supplying IF and delayed RF gain control signals to the remainder of a television receiver, it is desirable to provide an integrated gain control circuit which may be utilized in a large number of receivers having a different circuit configurations in the IF and RF stages. A universal gain control circuit permits realization of the inherent cost advantages present in the large volume production of identical circuits.

SUMMARY OF THE INVENTION

It is, therefore, an object of this invention to provide an improved automatic voltage control circuit.

An additional object of this invention is to provide a gain control circuit having at least two outputs, one of which varies for input signals in a first region and which is held constant for input signals in a second region, in which the second output varies.

It is a further object of this invention to provide a gain control circuit providing a delayed gain control voltage at a first of two outputs, the second of which is varied initially in response to changes in the level of an input signal in a first region, with the second output being held constant by means of a negative feedback from the first output when the input signal reaches a second predetermined region.

In accordance with a preferred embodiment of this invention, an input circuit provides an input voltage which is to be utilized by first and second amplifiers, with the first amplifier providing an output which is indicative of the level of the input voltage in a first region. The second amplifier provides a first substantially constant output with the input voltage in the first region and provides a second output indicative of the level of the input voltage in a second region, with a feedback circuit coupled to the output of the second amplifier for supplying a control signal to the input of the first amplifier. The control signal is substantially stable with the input signal voltage in the first region and varies in an amount to offset the input voltage variations in the second region to cause the output of the first amplifier to be substantially constant for input voltages in the second region.

In a more specific embodiment of the invention the input voltage is generated in a sample and hold gated AGC circuit responsive to the syncrhonizing and flyback pulses in a television receiver for sampling the signal level during coincidence of the syncrhonizing and flyback pulses to provide the input voltage supplied to the first and second amplifier circuits described above.

DETAILED DESCRIPTION

Figure 1:
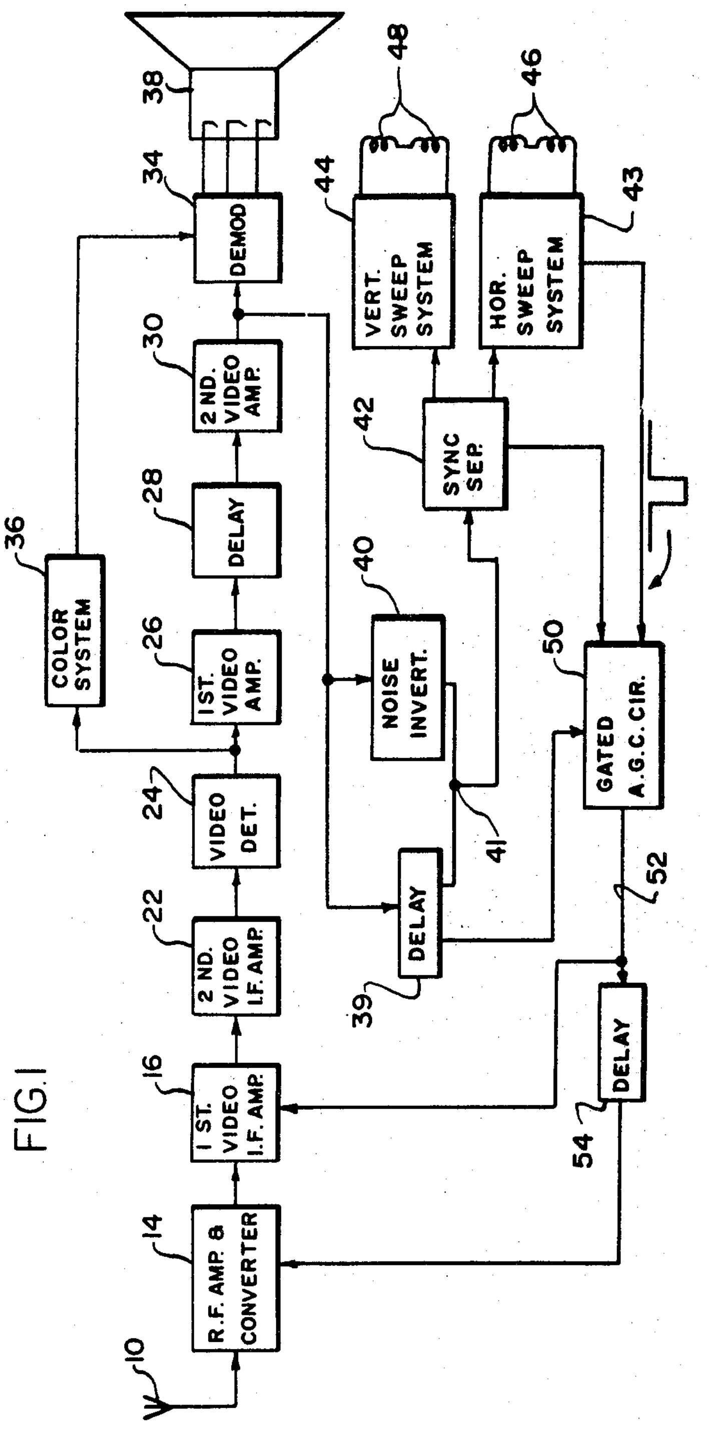
FIG. 1 is a block diagram of a television receiver in which a gated AGC circuit may be employed.

Referring now to the drawing, there is shown in FIG. 1 a typical color television receiver in which an incoming signal is received by an antenna 10 and is applied to a radio frequency amplifier and converter stage 14, which amplifies and reduces the frequency of the received signals to provide intermediate frequency (IF) signals. These IF signals then are amplified in a series of video IF amplifiers, indicated in the drawing as first and second video IF amplifiers 16 and 22. The output of the second IF amplifier 22 is detected in a video detector stage 24 to provide a composite video signal, with the brightness components and synchronizing components in the video signal being amplified in a first video amplifier circuit 26 and also being applied to the input of a color processing system 36 responsive to the color signal components of the detected video signal.

The amplified brightness and synchronizing signal components from the output of the first video amplifier stage 26 are delyed in a delay circuit 28, for purposes well-known to those skilled in the art, are amplified in a second video amplifier 30 and are applied to one input of a direct demodulator circuit 34. The composite chroma signal components, after being processed in the color system 36, are applied to another input of the demodulator 34, which produces the red, blue, and green video voltages directly on three outputs coupled with the three different cathodes of a color chathode ray tube 38.

In addition to providing the brightness signal components to one of the inputs of the demodulator circuit 34, the second video amplifier stage 30 also supplies the composite video signal to a delay circuit 39 and a noise inverter 40. One output of the delay circuit 39 and the output of the noise inverter circuit 40 are combined at a junction 41, so that noise impulses in excess of the signal synchronizing components of the composite signal are removed at the terminal 41. As a result, noise-free video signals are applied from the terminal 41 to a synchronizing signal separator circuit 42, which supplies the horizontal and vertical synchronizing signal components to horizontal and vertical sweep systems 43 and 44, respectively. The sweep systems 43 and 44 develop the horizontal and vertical sweep signals in a horizontal deflection winding 46 and a vertical deflection winding 48, each of which is disposed on the neck of the cathode ray tube 38.

Another output of the delay circuit 39 also is applied to a gated automatic gain control circuit 50, which is gated by the horizontal retrace pulses obtained from the horizontal sweep system 43 and the synchronizing pulses obtained from the synchronizing signal separator circuit 42 to develop a gain control signal during the gated intervals. This gain control signal appears on a conductor 52 and changes in amplitude according to the amplitude of the peak synchronizing pulse components present during the gating interval. The strength or magnitude of the synchronizing pulse components, is, in turn, dependent upon the strength of incoming signals appearing at the antenna 10; so that the voltage appearing on the lead 52 is representative of the input signal strength.

Depending on the nature of the circuit with which the gain control circuit 50 is used, the gain control voltage on the lead 52 may be either a forward or reverse (positive or negative) gain control voltage and is applied to the first video IF stage 16 and is delayed by a suitable delay circuit 54 and applied to the RF amplifier and converter stage 14. Thus, the gain control voltage operates initially to control the gain of the video IF stage 16 and, for increased signal levels, operates to control the gain of the RF and converter stage 14 in a manner which is well-known. The interconnections of the gated AGC circuit 50 with the delay circuit 54 and the first video amplifier 16 and RF amplifier and converter stage 14 are indicated functionally in FIG. 1, and the circuit connections shown do not necessarily reflect actual circuit connections employed in the implementation of the functions indicated in block form in FIG. 1.

Figure 2:
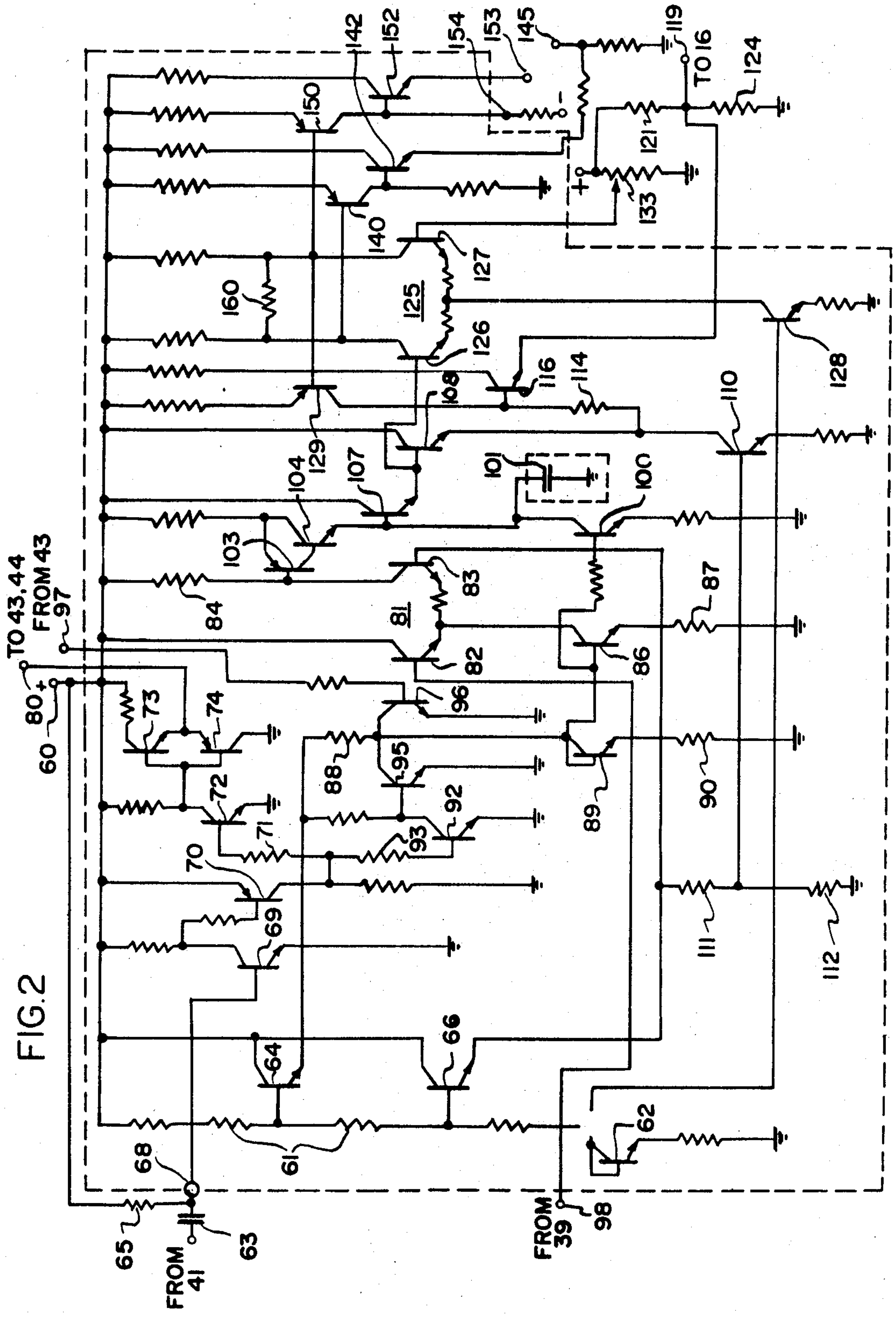
FIG. 2 is a detailed circuit diagram of a preferred embodiment of the invention which may be used in the television receiver shown in FIG. 1.

Referring now to FIG. 2, there is shown in detail the gated AGC and delay circuits which are illustrated in block form in FIG. 1 as the circuits 50 and 54. The components enclosed in dotted lines in FIG. 2 all may be formed on an integrated circuit chip, which may be a separate chip as illustrated in FIG. 2 or may be part of a larger integrated circuit including additional circuit functions of the television receiver shown in block form in FIG. 1.

Positive DC operating potential for the circuit shown in FIG. 2 is applied to an input terminal or bonding pad 60 across a voltage divider including a plurality of resistors 61 and an NPN transistor diode 62 connected between the terminal 60 and ground. The biasing potentials for various parts of this circuit then are obtained from the voltage divider 61, 62 at selected points coupled to the bases of a pair of reference voltage transistors 64 and 66, the emitters of which supply different levels of bias or operating potential to different parts of the circuit.

The noise-free vide signals at the junction 41 (FIG. 1) are applied to a bonding pad 68 through a capacitor 63. Also connected to the bonding pad 68 is a resistor 65, the other end of which connects to the source of positive DC operating potential. The action of the capacitor 63 along with the resistor 65 serves to clamp the peak portions of the synchronizing signal components at the base of the NPN input transistor 69, causing synchronizing signal separation in the conventional manner. The synchronizing signals present on the collector of the transistor 69 are amplified by lateral PNP transistor 70, the collector of which supplies the signals to the synchronizing signal inverter NPN transistor 72 through a coupling resistor 71. Output signals from the synchronizing signal separator portion of the circuit are obtained from the junction of the emitters of an NPN transistor 73 and a substrate PNP transistor 74, the collector-emitter paths of which are connected in 60 between the bonding pad 73 and ground. This junction of the emitter of the transistors 73 and 74 provides the separated synchronizing pulses on an output bonding pad 80, with these pulses then being applied to the vertical and horizontal sweep systems 44 and 43, shown in FIG. 1. The inputs to the transistors 73 and 74 are applied in common to the bases thereof, with the synchronizing signal separator circuit being of conventional configuration.

To provide the gated AGC function for operating the automatic gain control circuitry, a differential amplifier comparator circuit 81 is provided, consisting of a pair of NPN transistors 82 and 83, with the collector of the transistor 82 being connected directly to the B+ supply bonding pad 60 and the collector of the transistor 83 being connected to the bonding pad 60 through a collector load resistor 84. The emitters of the transistors 82 and 83 are connected to an NPN current source transistor 86 the emitter of which is connected through a transistor 87 to ground.

Bias potential for the current source transistor 86 is obtained from a voltage supply in the form of a voltage divider coupled with the emitter of the transistor 64 and including a resistor 88, a transistor diode 89, and an additional resistor 90, coupled between the emitter of the reference voltage transistor 64 to ground. In the absence of synchronizing signal pulse portions of the signal on the input terminal 68, the transistor 69 is rendered non-conductive, causing the transistor 70 also to be non-conductive, causing a control transistor 92, the base of which is coupled through a coupling resistor 93 to the collector of the transistor 70, also to be non-conductive. As a consequence, the potential on the collector of the transistor 92 is high, substantially at the level of the potential on the emitter of the transistor 64, which forward biases into heavy conduction an NPN shunt transistor 95 to shunt the junction between the resistor 88 and the diode 89 to ground. This clamping or shunting of the power supply for the base of the current source transistor 86 to ground causes the transistor 86 to be non-conductive. In addition, the junction between the resistor 88 and the diode 89 is shunted to ground through a normally conductive transistor 96, the base of which is connected to a bonding pad 97 to which is applied a signal from the horizontal sweep system 43 including the flyback pulse. During the trace intervals of the signal, the level of signal applied to the bonding pad 97 is relatively positive, forward biasing the transistor 96 into conduction and further shunting the power supply and preventing the current source transistor 86 from conducting. Thus, so long as either of the transistors 95 or 96 is conductive, the current source transistor 86 is non-conductive and the comparator circuit 81 is off or inoperative.

The delayed composite input signals from the second output of the delayed circuit 39 (FIG. 1) are applied to an AGC signal input bonding pad 98 connected to the base of the transistor 82. A reference voltage for establishing the operating point of the comparator circuit 81 is obtained from the emitter of the reference transistor 66 which is connected directly to the base of the transistor 83, which is the reference transistor for the comparator circuit 81.

When a synchronizing pulse is applied to the bonding pad 68, the transistors 69 and 70 are rendered conductive, which in turn causes the transistor 92 to be rendered conductive, causing the potential applied to the base of the transistor 95 to be insufficient to forward bias the transistor 95. Thus, the transistor 95 becomes non-conductive and opens the shunt path formerly provided through the transistor 95. During the time that the synchronizing pulses are present on the bonding pad 68 a flyback pulse is applied to the bonding pad 97. This flyback pulse is a negative-going pulse, as indicated in FIG. 1, and causes the transistor 96 to be rendered non-conductive.

Coincidence of the synchronizing signal pulse and the flyback pulse, simultaneously rendering the transistors 95 and 96 non-conductive, provides a forward biasing voltage for the current source transistor 86 which conducts, causing the comparator circuit 81 to operate in a conventional manner. At the same time that the current source transistor 86 is enabled, a second NPN current source transistor 100, also connected to the junction of the resistor 88 and the transistor diode 89, is rendered conductive.

The collector of the current source transistor 100 is connected to an external AGC filter or storage capacitor 101, which is utilized to supply the AGC control voltage obtained during the synchronizing signal portion of the composite television signal. The junction of the collector of the transistor 100 and the capacitor 101 further is connected to a second current source formed from a lateral PNP transistor 103 driving an NPN transistor 104 to form a PNP current source, with the emitter of the transistor 104 supplying current to the capacitor 101 and the emitter of the transistor 103 and the collector of the transistor 104 being connected to the B+ bonding pad 60. The base of the transistor 103 is connected to the collector of the transistor 83 in the comparator circuit and is rendered more or less conductive in accordance with the signal level applied to the base of the transistor 82 of the comparator circuit 81, when the comparator circuit 81 is rendered operative by conduction of the current source transistor 86, as previously described.

The operation of the two current sources 100 and 103–104 is such that the current source 103–104 supplies a charge to the capacitor 101 to build up the charge thereon, and the current source transistor 100 operates to remove charge from the capacitor 101. The comparator circuit 81, along with the two current sources coupled to the capacitor 101, operates as a sample and hold circuit, with the capacitor 101 storing the charge which it attains during the conductive intervals of operation of the comparator circuit 81 and the current source 100. When the sampling interval, as determined by coincidence of the synchronizing and flyback pulses, has terminated, the current sources 86 and 100 both are disabled; so that the current source 103–104 also is disabled to open the charging and discharging paths for the capacitor 101. During the next sampling interval, the capacitor 101 is either charged to a higher level or discharged in accordance with the relative currents of the current sources 100 and 103–104, as determined by the operation of the comparator circuit 81 in response to the level of the input signals applied to the input bonding pad 98.

The voltage present on the capacitor 101 is applied through a cascaded pair of NPN emitter-follower transistors 107 and 108, supplied with operating current from an NPN current source transistor 110, the base of which is coupled to the junction of a pair of resistors in a voltage divider 111, 112 connected between emitter of the reference transistor 66 and ground. The junction of the emitter of the emitter-follower transistor 108 and the collector of the current source transistor 110 is coupled through a low value coupling resistor 114 to the base of an IF AGC output NPN emitter-follower transistor 116, which provides the IF gain control voltage to the first video IF amplifier 16, shown in FIG. 1, at an output bonding pad 119 connected to the junction of a pair of resistors 121 and 124 coupled between a source of positive operating potential and gound. Thus, as the AGC voltage present on the capacitor 101 increases, this increase is reflected through the transistors 107, 108 and 116 as an increase in the IF gain control voltage at the terminal 119. The value of the resistor 114 is selected to be low enough that the voltage of the IF gain control signal dropped across the resistor 114 is insignificant.

As stated previously, it is desirable to provide the gain reduction function for the IF amplifier stages initially, while holding the gain of the RF amplifier and converter stage 14 constant until a predetermined level of gain control signal is reached. In other words the gain control or gain reduction of the RF stage 14 should be delayed until a predetermined point below overloading of the converter is reached by the operation of the circuit.

In order to provide this delay, a comparison differential amplifier 125 is provided, including a pair of NPN transistors 126 and 127, with the collectors of both of the transistors 126 and 127 being connected through collector load resistors to the bonding pad 60. The emitters of the transistors 126 and 127 are supplied with operating current from a current source transistor 128, the base of which is connected to the collector of the transistor diode 62. The operation of the differential amplifier 125 as a comparator is conventional, with the AGC voltage present on the emitter of the emitter-follower transistor 107 being connected to the base of the transistor 126 as the input voltage for the comparator 125. The reference vole for determining the amount of RF delay, or the voltage at which RF gain control takes place, is applied to the base of the transistor 127 from the tap of a potentiometer 133 coupled between the source of positive operating potential and ground. Thus, the reference level establishing the delay may be varied in accordance with the setting on the top of the potentiometer 133 in order to adjust the circuit for operation in different television receivers with different requirement.

The circuit is adjusted so that initially the transistor 12 is in a state of full conduction, with the transistor 126 being rendered non-conductive. The collector of the transistor 127 is connected to the base of a lateral PNP transistor 129, driving the transistor 129 into full conduction. This lateral PNP transistor 129 is operated as feedback transistor and the emitter is connected through a load resistor to the bonding pad 60, with the collector being connected to the junction of the resistor 114 and the base of the emitter-follower transistor 116.

During the initial interval of time when the control of the gain, as determined by the charge on the capacitor 101, is insufficient to change the state of the comparator 125, as increasing gain control voltage on the capacitor 101 causes the gain control for the circuit to be effected solely by the output of the emitter-follower transistor 116 to the first video IF amplifier 16. The circuit parameters are selected so that full conduction of the transistor 129 into resistor 114 causes the base of the transistor 116 to be $V_A$ volts higher than the voltage on the emitter of the transistor 108, where $V_A$ is the minimum voltage range at the base of transistor 126 required to change the comparator 125 from its first state to its second state. The base of the transistor 116 is free to move with the AGC voltage present on the emitter of the transistor 108, since the conductivity of the transistor 129 is constant during this initial interval of the gain control voltage. Thus, the slope of the gain control for an increasing incoming signal strength at the IF output bonding pad 119 is indicated in FIG. 3 by the portion 130 of the IF AGC voltage curve.

When a point is reached where the input AGC voltage applied to the base of the transistor 126 from the emitter of the transistor 107 is such as to begin to cause the transistor 126 to conduct and to begin to cause the conductivity of the transistor 127 to be reduced, the conductivity of the transistor 129 becomes less. As described above, the circuit parameters have been selected so that the feedback provided by the collector of the transistor 129 is just the proper amount of negative feedback to the base of the transistor 116 to off-set the increases of voltage present due to the conduction of the transistor 108. This point is indicated in FIG. 3 as the incoming signal strength A and results in a holding of the IF output constant at a predetermined level as shown by the portion 131 of the IF voltage curve. At the same time, the RF gain control voltage commences changing, as indicated by the portion 134 of the RF AGC voltage curve shown in FIG. 3.

When the incoming signal strength reaches the point that the transistor 126 is fully conductive and the transistor 127 is rendered non-conductive (this point being indicated as point B in FIG. 3), the transistor 129 is rendered non-conductive. Thus, the base of the transistor 116 once again is permitted to track with the input AGC voltage on the emitter of the transistor 108, permitting a continuation of the IF gain control as indicated by the portion 135 of the IF AGC voltage curve shown in FIG. 3.

Figure 3:
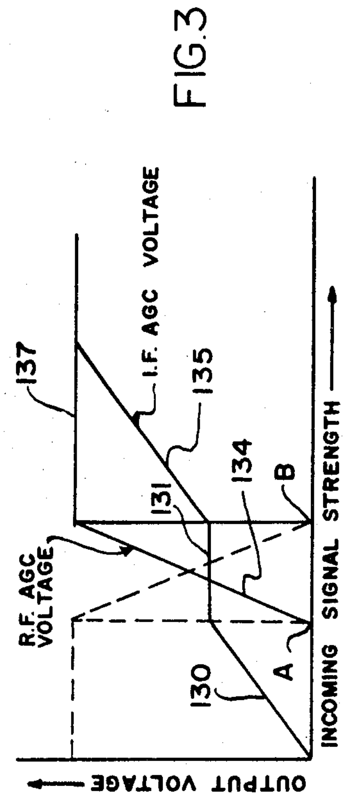
FIG. 3 shows waveforms useful in describing the operation of the circuit shown in FIG. 2.

At point B the entire RF gain control or gain reduction effected by the comparator circuit 125 has terminated, so that the RF AGC voltage is constant, as indicated by the portion 137 on the RF AGC voltage curve of FIG. 3. The collector of the transistor 126 is connected to a lateral PNP transistor 140, causing the transistor 140 to be non-conductive when the transistor 126 is non-conductive. The collector of the transistor 140 is coupled through an NPN emitter-follower 142 to an output bonding pad 145 to provide the forward RF AGC voltage indicated in FIG. 3. As the conductivity of the transistor 126 increases, the conductivity of the transistors 140 and 142 also increases to provide an increasing voltage at the bonding pad 145.

A reverse RF AGC voltage (shown in dotted lines in FIG. 3) also can be obtained from the comparator 125 and is provided by coupling the base of a lateral PNP transistor 150 to the collector of the transistor 127 in the comparator 125. The collector of the transistor 150 then is connected through an NPN emitter-follower transistor 152 to a reverse AGC output bonding pad 153.

Either the bonding pad 145 or the bonding pad 153 may be connected to provide the RF AGC voltage to the RF amplifier and converter stage 14 shown in FIG. 1, depending on the characteristics of the circuitry used in these stages. It also may be that for some applications both of the RF AGC voltages present on the bonding pads 145 and 153 may be utilized, but in different RF stages of the circuit. By providing both forward and reverse RF AGC voltages, however, maximum flexibility in the utilization of the circuit is possible. In addition, by providing the collector of the transistor 150 at the bonding pad 154, a negative DC supply may be affixed for RF amplifiers and converters which require a negative RF AGC voltage.

The conduction points of the lateral PNP transistors 129, 140 and 150 normally would lag the conduction points of the NPN transistors 126 and 127 in the comparator circuit, so that the break points A and B of the RF AGC voltage output curves and the IF AGC voltage output curves would not coincide as indicated in FIG. 3. It is desirable, however, that such coincidence does occur in the operation of the circuit; and to provide this coincidence a cross-coupling resistor 160 is connected between the collectors of the transistors 126 and 127. The magnitude of this resistor is selected to cause the transistors 129, 140 and 150 to be biased just below their turn-on or forward conduction point. Thus, when the transistors 129, 140 and 150 undergo a change in conduction due to the changes in the conductivity of the transistors 126 and 127, the changes of conductivity of the transistors 129, 140 and 150 follow the changes of conductivity of the transistors 126 and 127, providing the alignment of the break points in the IF and RF AGC control curves as indicated in FIG. 3.

It should be noted that if the input to the bonding pad 97 were open-circuited, the transistor 96 would be rendered non-conductive, permitting the AGC gating of the comparator 81 to be effected solely by the synchronizing pulses.

I claim:

1. In a television receiver responsive to a composite television signal, including information signal components and synchronizing signal components, and producing flyback pulses coincident with the synchronizing signal components, a system for providing output voltages indicative of the signal level of the composite television signal including in combination:

first amplifier means providing an output indicative of a level of input voltages in a first region;

second amplifier means providing a first substantially stable output with input voltages in said first region and providing a second output indicative of the level of input voltages in a second region;

input circuit means for applying input voltages to the inputs of the first and second amplifier means;

feedback circuit means coupled with the output of the second amplifier means for supplying a control signal to the input of the first amplifier means, with the control signal being substantially constant for input voltages in said first region, and for input voltages in said second region being variable in an amount to offset variations of input voltages in said second region to cause the output of the first amplifier means to be substantially constant;

a storage capacitor connected between a point of reference potential and the input circuit means;

a source of operating potential;

normally inoperative control means for controlling the charging and discharging of the storage capacitor;

said control means being rendered operative in response to the application of a supply voltage thereto;

supply voltage means coupled with the source of operating potential for providing a supply voltage to the control means;

gate circuit means coupled to the supply voltage means and operative to shunt the supply voltage to a point of reference potential, rendering the control means inoperative;

means responsive to at least said synchronizing pulses for rendering the gate circuit means inoperative, causing said supply voltage to be provided to the control means for the duration of the synchronizing pulses; and means for applying said composite television input signals to the control means which is responsive thereto to vary the charge on the capacitor in accordance therewith.

2. The combination according to claim 11 wherein the control means includes comparator circuit means having an output coupled with the capacitor and having a signal input and a reference input; with means for providing a reference potential to the reference input of the comparator circuit means, and said composite television input signals are supplied to the signal input of the comparator circuit means, with the supply voltage means supplying operating voltage to the comparator circuit means, the comparator circuit means being inoperative with the supply voltage shunted to said point of reference potential and being rendered operative with the gate circuit means rendered inoperative.

3. A sample and hold circuit for use in a television receiver responsive to composite input signals and providing synchronizing and flyback pulses, the circuit producing an output voltage indicative of the signal level of an input signal during a sampling interval, the output voltage being changeable in accordance with variations in the signal level during successive sampling intervals, including in combination:

a storage capacitor connected between a point of reference potential and an input junction;

a source of operating potential;

normally inoperative charge control means coupled between the source of operating potential and the storage capacitor for controlling the charge thereon in accordance with the signal level of input signals applied thereto;

means for supplying said composite television signals to the input of the charge control means;

supply voltage means coupled with the source of operating potential for supplying an operating voltage to the charge control means;

gate circuit means coupled with the supply voltage means and normally operative to shunt the operating voltage to a point of reference potential, thereby rendering the charge control means inoperative; and means responsive to at least said synchronizing pulses to render the gate circuit means inoperative, thereby causing the supply voltage means to supply said operating voltage to the charge control means rendering the control means operative to control the charge on the capacitor in accordance with the signal level of the input signals supplied to the control means.

4. The combination according to claim 3 wherein the gate circuit means includes first and second normally conductive shunt means to shunt the operating voltage to said point of reference potential, the first shunt means being rendered nonconductive by said synchronizing pulses and the second shunt means being rendered nonconductive by said flyback pulses.

5. A sample and hold circuit for use in a television receiver responsive to composite television input signals and providing synchronizing and flyback pulses, the circuit producing an output voltage indicative of the signal level of an input signal during a sampling interval, the output voltage being changeable in accordance with variations in the signal level during successive sampling intervals including in combination:

a storage capacitor connected between a point of reference potential and an input junction;

a source of operation potential;

first and second current source means connected in series between the source of operating potential and said point of reference potential, with the first and second current sources being connected together at the input junction of the capacitor, the first current source means operating to supply charge to the capacitor and the second current source means operative to remove charge from the capacitor;

comparator circuit means having an output, a signal input and a reference input, the comparator output being connected to the first current source means for controlling the operation thereof;

means for supplying a reference potential to the reference input of the comparator circuit means for establishing a threshold level;

supply voltage means coupled with the source of operating potential for supplying an operating voltage to the comparator circuit means and the second current source means;

gate circuit means coupled with the supply voltage means and operative to shunt the supply voltage means to a point of reference potential, rendering the comparator circuit means and the second current source means inoperative, the comparator circuit means being inoperative causing the first current source means to be inoperative; and means responsive to at least said synchronizing pulses to render the gate circuit means inoperative causing operating voltage to be provided to the comparator circuit means and the second current source means for the duration of the synchronizing pulses; and means for applying said composite television input signals to the signal input of the comparator circuit means for comparison with the reference potential applied thereto.

6. The combination according to claim 5 wherein the gate circuit means includes first and second normally conductive shunt means to shunt the supply voltage means to said point of reference potential, the first shunt means being rendered nonconductive by said synchronizing pulses and the second shunt means being rendered nonconductive by said flyback pulses for rendering the voltage supply means operative upon coincidence of the flyback pulses and the synchronizing pulses to remove the first and second shunts from the voltage supply means to thereby render the comparator circuit means and the second current source means operative.

7. The combination according to claim 6 wherein the comparator circuit means provides an output to control the conductivity of the first current source means relative to the conductivity of the second current source means thereby varying the charge on the capacitor in accordance with the relative conductivities of the first and second current source means.

* * * * *